Sept. 11, 1934. T. TIGHE, JR 1,973,449
PROTECTOR FOR FOODS
Original Filed Aug. 25, 1932

Inventor
Thomas Tighe, Jr.

By Geo. P. Kimmel
Attorney

Patented Sept. 11, 1934

1,973,449

UNITED STATES PATENT OFFICE 1,973,449

PROTECTOR FOR FOODS

Thomas Tighe, Jr., Chicago, Ill., assignor to The Thermo Service Company, Inc., a corporation of Delaware Original application August 25, 1932, Serial No. 630,452. Divided and this application April 10, 1933, Serial No. 665,411

1 Claim. (Cl. 65—16)

This invention relates to a food protector for foods placed upon service plates, and has for its object to provide, in a manner as hereinafter set forth, a device of the class referred to for encompassing, in protecting relation, the food upon a plate when transporting the latter from a point of food supply to the point of service; with the protector so constructed to enable a plurality of protectors to maintain a series of service plates in stack relation with respect to each other to permit for conveniently and expeditiously transporting the stack by a single waiter for the purpose of serving quickly a number of persons at a banquet, and with the protectors acting to not only protect the foods upon the stacked plates but also preventing the foods from cooling while being transported to the point desired.

A further object of the invention is to provide, in a manner as hereinafter set forth, a protector for the purpose referred to including a body part having a reinforced rigid supporting means at an end thereof to increase the life of the protector.

Further objects of the invention are to provide, in a manner as hereinafter set forth, a protector for the purpose set forth, which is simple in its construction and arrangement, strong, durable, compact, thoroughly efficient in its use, conveniently handled and comparatively inexpensive to manufacture.

The invention forming the subject matter of this application is a division of my application filed August 25, 1932, Serial Number 630,452, issued as Patent No. 1,922,992 of August 15, 1933.

To the above ends essentially, and to others which may hereinafter appear, the invention consists of such parts, and such combination of parts which fall within the scope of the invention as claimed.

Figure 1:
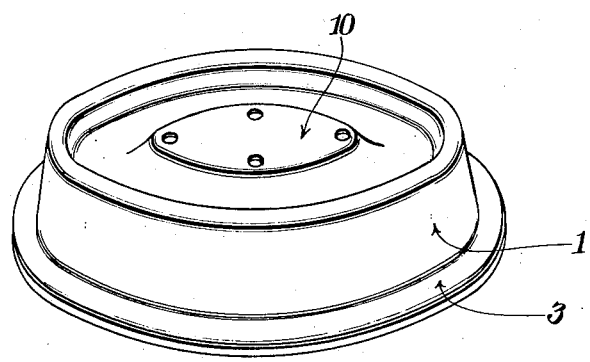
Figure 1 is a perspective view of a food protector in accordance with this invention.

Referring to the drawing, the protector includes an annular body 1 of the desired height and diameter and which gradually increases from its bottom to its top to provide it of tapered contour. The lower end 2 of body portion 1 is directed upon an outwardly extending concave curve and merges into an annular supporting flange 3 of angle-shape in transverse cross section.

The flange 3 is formed of a rear horizontally disposed leg 4, an upper bend 5 of convex curvature merging into a front vertically disposed leg consisting of an inner portion 6, a lower rounded bend 7 and an outer portion 8 of less height than and which is in snug contact throughout with the forward face of portion 6. The top edge 9 of portion 8 is squared and is positioned in close proximity to but below the point of mergence of bend 5 with portion 6.

The cross sectional width of the horizontal leg 4 is materially greater than the height of the vertical leg. The legs are disposed at right angles to each other. The leg 4 slightly inclines downwardly from the curved lower end 2 of body portion 1.

Integral with the upper end of body portion 1 is a closure 10 therefor. The latter consists of a horizontally disposed annular upper outer part 11 sloping slightly downwardly throughout from the upper end of body portion 1 and of slightly convexo-concave curvature in transverse cross section, a set of annular intermediate parts 12, 13 and 14 and a circular horizontally disposed central flat part 15. The part 12 is arranged in an upstanding position and inclines at a slight outward inclination from its lower to its upper end. The inclination of part 12 is in a direction outwardly with respect to the axis of the cover. The height of part 12 is greater than the transverse cross sectional length of part 11. The part 13 is substantially flat, horizontally disposed, positioned below parts 12, 14 and of greater length in transverse cross section than the height of part 12. The lower ends of the parts 12, 14 merge into the sides of part 13. The part 14 extends from its lower to its upper end at an inward inclination and at an inclination materially less than the inclination of part 12. The parts 12, 14 are disposed at opposite inclinations with respect to each other. The part 14 in transverse cross section is of slight concavo-convex contour and merges at its top into part 15. The latter is arranged below part 11 and positioned substantially in alignment with the horizontal center of part 12. The part 15 is formed in close proximity to its point of mergence with part 14 with a row of equi-distant spaced openings 16 and has its upper face uninterrupted throughout between the edges of the latter.

The parts 12, 13, 14 and 15 coact to provide a wide groove having its outer wall provided by part 12 of greater height than its inner wall formed by part 14. The groove is of a width to receive endless ribs of varying diameters and heights which depend from the bottom of service plates adapted to be seated on part 11. The outwardly inclined part 12 which provides the outer wall of the groove, acts as a stop to engage the outer lower corner of a depending rib on a service plate to prevent the latter from sliding off the protector. The inwardly inclined part 14, which provides the inner wall of the groove is so formed that if the plate shifts toward the axis of the cover, the depending rib on the plate will be engaged only at its lower inner corner by part 14. The part 11, due to its sloping downwardly from the top of body portion 1 offers a greater supporting surface for the service plate than if the slope was omitted.

Figure 2:
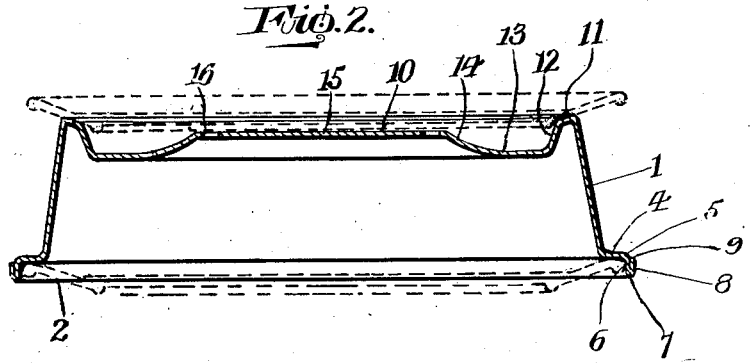
Figure 2 is a cross sectional view thereof.
Figure 3:
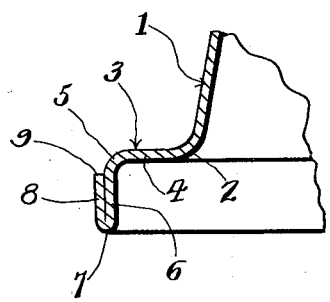
Figure 3 is a fragmentary view in vertical section upon an enlarged scale.

When the protector is employed, it is mounted upon a lower service plate and encloses and protects the food carried by the latter. When supporting an upper service plate, the bottom of the latter is mounted upon part 11 and the part 12 encompasses the flange, bead or rib on the bottom of such plate. The part 15 is spaced from the bottom of the upper service plate to permit for the exhaust of steam or vapor through the openings 16. The form of the closure 10 prevents the upper service plate, when mounted on the closure, from shifting thereoff. The flange 3 prevents the protector from shifting off the lower service plate. The form of protector also enables a stack of service plates being carried in superposed relation with respect to a series of protectors as illustrated by the dotted line showing Figure 2.

What I claim is:—

In a food protector, a ring-like body portion of greater diameter at its bottom than at its top provided at its bottom with an outwardly directed annular lower supporting flange of angle shaped cross-section to provide a horizontal and a vertical leg, the latter depending from the former and consisting of a pair of vertical portions snugly abutting throughout, one of said portions terminating in the other and having a free edge spaced below the upper face of said horizontal leg, the other portion merging into said horizontal leg, said body portion provided at its top with an integral annular upper outer cover portion extending inward and slightly downward from the top of the body portion, an outer intermediate cover portion extending downward from said upper outer cover portion at a relatively steep angle, an intermediate annular cover portion extending horizontally inward from the outer intermediate cover portion, an inner intermediate cover portion extending angularly upward and inward from the intermediate annular cover portion at a less angle than that of the outer intermediate cover portion and to a less height than the upper edge of the body portion and a flat circular horizontal central part merging into the inner intermediate cover portion and lying substantially below the level of the upper outer cover portion.

THOMAS TIGHE, Jr.